United States Patent Office 2,800,395
Patented July 23, 1957

2,800,395
PREPARATION OF CARBON BLACK

George R. Bond, Jr., Paulsboro, N. J., assignor to Houdry Process Corporation, Wilmington, Del., a corporation of Delaware No Drawing. Application December 1, 1952,
Serial No. 323,500

13 Claims. (Cl. 23—209.5)

This invention relates generally to the catalytic decomposition of normally gaseous hydrocarbons such as propane, ethane, and methane to hydrogen and carbon, and is more particularly concerned with a novel treatment of the catalytic material utilized in the decomposition. It is especially concerned with the preparation from the said catalytic material of a novel carbon substitute having properties suitable for use, for example, as a rubber compounding agent.

Many methods have been proposed whereby hydrocarbons may be converted into their components of hydrogen and carbon, of which some are particularly concerned with the preparation of hydrogen or of hydrogen-containing gas for utilization in processes requiring hydrogen, such as for the hydrogenation of vegetable or mineral oils. Other such processes are concerned primarily with the production of carbon blacks having special properties, for example, for use in the preparation of many types of natural and synthetic vulcanized rubber products. Processes are also known in which both the hydrogen and carbon produced are applied to useful purposes. For most of these hydrocarbon conversion operations it has been found that certain agents may be employed in the reaction to catalyze the hydrocarbon decomposition with certain advantages including reduced temperatures or pressures, or in obtaining higher rates of decomposition.

Many types of catalytic agents have been suggested for these operations, including metals, oxides of metals, and various other metal-containing compounds exhibiting high catalytic activity in the decomposition of hydrocarbons. Among the catalytic materials specifically suggested there are included nickel, nickel oxide, iron and its various oxides, platinum and many other materials exhibiting what may be generally described as dehydrogenation activity. It has been suggested further that these catalytically active agents may be supported on suitable carriers such as on oxides which are not readily reduced by hydrogen nor particularly affected by the relatively high temperatures employed. Such oxides include for example alumina or silica.

The catalyst materials suitable for use in accordance with the present invention include supported dehydrogenating agents characterized by their ability of forming carbonyls, readily volatilizable chlorides, or other chemical compounds readily removable in a gaseous state. These volatilizable compounds can be formed by reaction with suitable chemical agents introduced into contact with such dehydrogenating components at the proper reaction conditions subsequent to their use for promoting hydrocarbon decomposition. The described dehydrogenating components are supported on carriers which are relatively non-reactive with the chemical agents subsequently utilized to react with the dehydrogenation component to form these volatilizable compounds and which have suitable physical characteristics such as that of being readily comminuted as well as having certain other characteristics described in greater detail below.

In accordance with the present invention carbon black substitute is prepared by a process involving the decomposition of light hydrocarbons in the presence of a catalytic agent of the type above described comprising a suitable dehydrogenation component supported on an oxide carrier having the properties specified, thereby effecting carbon deposition in and on such catalytic agent. The carbon-bearing catalytic agent is removed from the hydrocarbon decomposition zone and subjected to treatment with a suitable reactive material for formation by reaction with the dehydrogenating component of a volatile compound to free the carbon-bearing material of substantially all of the dehydrogenation component, after which the carrier residue is subjected to a physical treatment to reduce the same to a state of extreme fineness.

Suitable catalysts for this operation are those employing as dehydrogenation components metals and compounds of the iron group, including: nickel, nickel oxide, and other nickel-containing compounds; iron, iron oxides; and to a lesser degree the analogous cobalt compounds. As carriers for these dehydrogenation components materials are employed having the properties previously described, which are in the form of or are readily converted to extremely fine and porous form, and which are compatible with carbon and carbon mixtures suitable for use in many systems in which high purity carbon black is suitable. One of the requirements of such support material is that in itself it has substantially no catalytic activity. Examples of suitable support materials include forms of finely divided silica such as colloidal silica or silica aerogel or other materials preferably of relatively high porosity such as diatomaceous earth and other synthetic or naturally occurring siliceous materials which have normally or may be treated to have no appreciable catalytic activity. The composite catalyst may have the dehydrogenation component present in an amount in the range of 0.01 to 10% by weight of the total catalyst mass.

A full understanding of the nature of this invention will be had from the following examples which are indicative of the types of catalytic material suitable in the practice of the invention and of the process involved. It is to be understood that these examples are illustrative and are not to be construed as limiting.

Example I

Fifty parts of nickel nitrate were dissolved in 1500 parts of water to give a solution containing approximately 10 parts of nickel. This solution was mixed with 1000 parts of a support comprising 900 parts of diatomaceous earth and 100 parts of a bonding agent, Volclay. An additional 250 parts of water and 2 parts of concentrated ammonium hydroxide were added to the mixture and the whole was thoroughly mixed. A portion of this material was molded into substantially uniformly sized cylindrical pellets of approximately 4 mm. in length by 4 mm. in diameter. The cast pellets were dried and heated at 1200° F. to convert the nickel nitrate to the oxide form.

Example II

A portion of the catalyst prepared in Example I was employed in the conversion of propane at temperatures in the range of 1200–1450° F. and at a space rate of about 1.75 gaseous volumes (STP) per volume of catalyst per minute for a period of 158 minutes. The off-gas from this conversion contained hydrogen in the order of better than 75% by volume of the total gas. The catalyst material removed from the reaction zone had associated therewith carbon in an amount constituting approximately 36.4% by weight of the catalyst.

Example III

A sample of the same catalyst was employed in the conversion of methane at temperatures in the range of 1400–1500° F. and at an average space rate of 1.2 gaseous volumes (STP) per volume of catalyst per minute for a period of 400 minutes. The off-gas from this reaction contained hydrogen in the order of about 40% by volume and the catalyst removed from the reaction zone had associated therewith approximately 32–33% carbon by weight of the catalyst.

*Example IV*

Another sample of the catalyst of Example I was utilized in the conversion of propane at temperatures in the range of 900–1300° F. and at a space rate of about 1.75 gaseous volumes (STP) per volume of catalyst per minute for a period of 510 minutes. The product gas contained in the order of 50–60% by volume of hydrogen and the catalyst removed from the reactor had associated therewith carbon, constituting approximately 101% by weight of the catalyst.

*Example V*

A catalyst carbon mixture obtained as in the Example IV is introduced into a reaction zone and contacted at temperatures in the range of 100–400° F. with gas comprising carbon monoxide whereby substantially all of the nickel associated with the catalyst is converted to volatile nickel carbonyl which is swept out of the treating zone by the gas flow. The carbon-containing material thus freed of the dehydrogenative component is cooled and passed through suitable grinding equipment where it is comminuted to relatively fine form having most of the characteristics and similar nature to those of carbon black suitable for use in rubber compounding and the like.

*Example VI*

Similarly, an iron-containing catalyst-carbon mixture is treated in a reaction zone at temperatures in the range of 900–1200° F. with anhydrous chlorine. Volatile iron chloride formed by the reaction is removed in the gas stream and the catalyst mass is substantially freed of the dehydrogenation component by such reaction. The residual material after comminution is likewise suitable as a carbon black substitute.

The foregoing examples are indicative merely of some types of materials and operations which may be employed in the satisfactory performance of the invention and modifications may be made obviously within the scope thereof. For instance, the amount of carbon associated with the catalyst material may be varied within wide limits according to the needs and desires by controlling the duration of the carbon deposition operation as is shown by a comparison of Examples II and IV. Likewise there is considerable leeway in the type of support utilized in the preparation of the catalyst and a variety of suitable materials is possible including in addition to those previously named, for example, zinc oxide or carbon.

Obivously many modifications and variations of the invention as hereinbefore set forth may be made without departing from the spirit and scope thereof, and therefore only such limitations should be imposed as are indicated in the appended claims.

I claim:

1. The method of preparing a carbon black substitute comprising, decomposing normally gaseous hydrocarbons to products including free carbon by contact at decomposition conditions with a contact material consisting of a catalytically inactive support having deposited therewith a catalytically active dehydrogenation promoting component of the iron group of the periodic system and characterized by the ability of forming volatilizable compounds, said active components being present in an amount in the range of 0.01 to 10% by weight of the total contact material, thereby forming free carbon in said contact material, recovering the carbon-containing contact material and chemically converting said dehydrogenation promoting component therein to a volatilizable compound, volatilizing said volatilizable compound and recovering the residue consisting substantially only of free carbon deposited in the catalytically inactive support, physically converting said residue to extremely fine particles, and recovering said fine particles as carbon black substitute.

2. The method of claim 1 in which said volatilizable compound is a carbonyl.

3. The method of claim 1 wherein said chemical conversion is effected by contact with carbon monoxide.

4. The method of claim 3 wherein said contact with carbon monoxide is effected at reaction conditions including temperature in the range of 100–400° F.

5. The method of claim 1 in which said volatilizable compound is a halide.

6. The method of claim 1 wherein said chemical conversion is effected by contact with at least one member of the group consisting of chlorine, hydrochloric acid and organic chlorides.

7. The method of claim 6 wherein said contact is effected at reaction conditions including temperature in the range of 900–1200° F.

8. The method of preparing a carbon black substitute which includes depositing carbon in a contact material by decomposition of normally gaseous hydrocarbons in the presence of such contact material, such method comprising, introducing a normally gaseous hydrocarbon charge into a reaction zone at decomposition conditions including elevated temperature and a contact mass, said contact mass consisting of a siliceous support having deposited therewith a dehydrogenation promoting component present in an amout in the range of 0.01 to 10% by weight of the total contact mass, said dehydrogenation promoting component being at least one member of the group consisting of nickel, nickel compounds, iron, and iron oxides, effecting decomposition of at least a portion of said charge to products including carbon deposited in said contact mass to form a carbon-contact mass mixture, removing said mixture from said reaction zone, treating said removed mixture with a suitable reactive agent to form with said dehydrogenation promoting component a volatile compound, separating substantially all of said dehydrogenation promoting component from said removed mixture as said volatile compound, and recovering as carbon black substitute residual solids composed of said siliceous support and said carbon.

9. The method of claim 8 wherein said dehydrogenation promoting component comprises nickel.

10. The method of claim 8 wherein said dehydrogenation promoting component comprises iron.

11. The method of claim 8 wherein said siliceous support is silica gel.

12. The method of claim 8 wherein said siliceous support is a naturally occurring mineral.

13. The method according to claim 1 wherein said inactive support consists of zinc oxide.

References Cited in the file of this patent

UNITED STATES PATENTS

| | | |
|---|---|---|
| 455,229 | Mond | June 30, 1891 |
| 1,589,532 | Hoodless | June 22, 1926 |
| 1,868,921 | Schmidt et al. | July 26, 1932 |
| 1,894,764 | Grosskinsky et al. | Jan. 17, 1933 |
| 2,600,379 | Doumoni et al. | June 17, 1952 |